US009422931B2

(12) United States Patent
Mostert et al.

(10) Patent No.: US 9,422,931 B2
(45) Date of Patent: Aug. 23, 2016

(54) MILKING INSTALLATION WITH MILK PUMP

(71) Applicant: Lely Patent N.V., Maassluis (NL)

(72) Inventors: Gerard Mostert, Schipluiden (NL); Jacobus Izaak Van De Walle, Nuenen (NL); Dimitris Douzoulikopoulos, Spijkenisse (NL)

(73) Assignee: LELY PATENT N.V., Maassluis (NL)

( * ) Notice: Subject to any disclaimer, the term of this patent is extended or adjusted under 35 U.S.C. 154(b) by 342 days.

(21) Appl. No.: 13/869,985

(22) Filed: Apr. 25, 2013

(65) Prior Publication Data

US 2013/0233419 A1 Sep. 12, 2013

Related U.S. Application Data

(63) Continuation of application No. PCT/NL2011/000065, filed on Sep. 22, 2011.

(30) Foreign Application Priority Data

Oct. 25, 2010 (NL) .................................... 1038329

(51) Int. Cl.
*A01J 5/04* (2006.01)
*F04B 43/08* (2006.01)
*F04B 43/113* (2006.01)

(52) U.S. Cl.
CPC .............. *F04B 43/08* (2013.01); *A01J 5/042* (2013.01); *F04B 43/084* (2013.01); *F04B 43/113* (2013.01); *Y10T 137/85978* (2015.04)

(58) Field of Classification Search
CPC ....................................................... A01K 1/12
USPC ......... 119/14.42, 14.03, 14.43; 417/478, 394
See application file for complete search history.

(56) References Cited

U.S. PATENT DOCUMENTS 840,510 A * 1/1907 Ohlhaver ................... 119/14.42
3,062,153 A 11/1962 Losey (Continued)

FOREIGN PATENT DOCUMENTS

AT 10708 U1 8/2009
EP 2128442 A1 12/2009

(Continued)

OTHER PUBLICATIONS

International Search Report of PCT/NL2011/000065 issued on Jun. 3, 2013.

(Continued)

*Primary Examiner* — Rob Swiatek
*Assistant Examiner* — Morgan T Barlow
(74) *Attorney, Agent, or Firm* — Oblon, McClelland, Maier & Neustadt, L.L.P.

(57) ABSTRACT

A milking installation with a milking robot for automatically connecting teat cups to the teats of a dairy animal has milk lines extending between the teat cups and a milk de-aeration unit or milk glass. A de-aeration port is present at the top of the de-aeration unit and a de-aeration line connects the milk glass to a vacuum system. At the bottom of the milk glass a milk inlet line is provided which connects the milk glass to the milk pump. The milk pump includes a milk inlet, a pump housing, a milk outlet. The milk pump is a membrane pump which type of pump is known to be gentle to the milk and thus reduce occurrence of lypolysis of the milk when pumped through the milking installation.

16 Claims, 4 Drawing Sheets

(56) References Cited

U.S. PATENT DOCUMENTS

| | | | | |
|---|---|---|---|---|
| 4,452,572 | A * | 6/1984 | Evrard | 417/395 |
| 4,906,229 | A * | 3/1990 | Wampler | 600/16 |
| 5,769,025 | A * | 6/1998 | van der Lely et al. | 119/14.42 |
| 5,964,580 | A * | 10/1999 | Taga | 417/394 |
| 6,352,455 | B1 * | 3/2002 | Guagliano et al. | 440/38 |
| 6,607,368 | B1 * | 8/2003 | Ross et al. | 417/412 |
| 6,672,847 | B2 * | 1/2004 | Dooley | 417/412 |
| 7,469,748 | B2 * | 12/2008 | Ocalan et al. | 166/372 |
| 8,172,554 | B2 * | 5/2012 | Yajima | 417/383 |
| 8,403,654 | B2 * | 3/2013 | Podesta et al. | 417/478 |
| 2004/0184938 | A1 * | 9/2004 | Champ et al. | 417/478 |
| 2005/0238504 | A1 * | 10/2005 | Yajima | 417/394 |
| 2007/0031273 | A1 * | 2/2007 | Yajima | 417/478 |
| 2011/0220028 | A1 * | 9/2011 | Duke | 119/14.02 |
| 2013/0195683 | A1 * | 8/2013 | Andersen et al. | 417/53 |

FOREIGN PATENT DOCUMENTS

| | | |
|---|---|---|
| GB | 1213849 A | 11/1970 |
| GB | 2192673 A | 1/1988 |

OTHER PUBLICATIONS

International Preliminary Report on Patentability of PCT/NL2011/000065 issued on Jun. 12, 2013.

* cited by examiner

MILKING INSTALLATION WITH MILK PUMP

CROSS REFERENCE TO RELATED APPLICATIONS

This application is a continuation of PCT application number PCT/2011/000065 filed on 22 Sep. 2011, which claims priority from Netherlands application number 1039329 filed on 25 Oct. 2010. Both applications are hereby incorporated by reference in their entireties.

BACKGROUND OF THE INVENTION

1. Field of the Invention

The invention relates to a milking installation with a milk pump.

2. Description of the Related Art

Milking installations generally include at least one set of teat cups with a plurality of teat cups through which milk flows under vacuum to a temporary storage and milk de-aeration unit e.g. a milk glass and a pump to transport the milk from the milk glass to an accumulating storage tank or to other containers. Such pumps generally are centrifugal pumps.

A drawback of the centrifugal pump is that such pumps damage the membrane surrounding the fat globules of the milk causing lypolysis and the creation of free fatty acids in the milk. This is an undesirable effect of pumping.

A solution proposed in the art and described in GB2192673 is the use of a diaphragm milk pump which reduces lypolysis occurring in the milk pumped in the milking installation. The diaphragm milk pump as described in GB2192673 includes a milk supply line through which the milk flows due to the force of gravity through a first one way valve into a first chamber. The first chamber is in open communication with a second chamber into which the milk flows under gravity and in an upper wall of the first chamber is an one way outlet valve. The second chamber is provided with a diaphragm and thus is the pumping chamber. A space between the diaphragm and the housing of the pump, isolated from the second chamber, is connected to a liquid or air pressure source that alternatingly forces the diaphragm upwards expelling fluid contained in the second chamber into the first chamber or pulling the diaphragm down allowing milk to enter the pumping chamber from the first chamber.

A drawback of the pump disclosed in GB2192673 is the fact that the pump cannot completely empty the chambers and thus a volume of milk will always remain inside the pump. Milk being an easily degradable fluid and also being susceptible to growth of spoilage organisms such as microbacteria, yeast and molds, it is highly undesirable to have a residual volume of milk present in the milk pump. The fluid remaining in the pump also prevents effective cleaning of the pump taking place. After cleaning the pump a volume of cleaning liquid would remain in the second chamber and upon resuming the milking process, milk would mix with the cleaning fluid. This contaminates milk with chemicals which again is undesirable.

BRIEF SUMMARY OF THE INVENTION

It is thus an object of the invention to provide a milk pump in a milking installation that solves or reduces the problem of lypolysis associated with the centrifugal pumping of milk without the drawbacks of the known solution. It is further an object of the invention to provide a milk pump in a milking installation in which no or hardly any milk is left behind at the end of a pumping stroke or pumping action. It is further an object of the invention to provide a milk pump in a milking installation which can be effectively cleaned and serviced. It is also an object of the present invention to provide alternative structures which are less cumbersome in assembly and operation and which moreover can be made relatively inexpensively. Alternatively it is an object of the invention to at least provide the public with a useful choice.

This object is achieved by providing a milking installation with a milk de-aeration unit and a membrane milk pump, the milk pump being arranged during use to pump milk out of the milk de-aeration unit, and the milk pump having a tubular housing, a flexible tubular member insertable in said housing and being hermetically sealable with respect to the housing, and comprising a first and a second open end, a fluid inlet member and a fluid outlet member attachable to the first respectively second open end of the tubular member, wherein the inlet member and the outlet member define a one-way flow path through the tubular member, and the housing having a connection port that is adapted to be coupled to a source of alternating pressure which during use alternatingly varies the pressure in a space between the housing and the tubular member between a decompression stage in which the tubular member expands allowing milk to enter the tubular member and a compression stage in which the tubular member collapses pushing milk out of the tubular member and the flexible tubular member, the fluid inlet member and the fluid outlet member forming a unitary subassembly that is removably insertable in said housing.

In the milking installation with a tubular membrane pump instead of a centrifugal pump the milk fat globules are no longer exposed to aeration during pumping and experience less shear forces, thus lypolysis is reduced and milk quality improves. The membrane pump of the invention has a tubular membrane and has no extra chamber in which milk remains after pumping. Thus this milking installation is more hygienic than the and better cleanable than the prior art milking installation with the membrane milk pump having two chambers. Milking installations are very intensively used and the membrane of the pump will need to be replaced on a regular basis. By providing a unitary subassembly the pump and thus the milking installation is easy serviceable. The unitary subassembly is assembled separately but designed to fit inside the housing. When a new membrane is needed in the pump, the subassembly is simply replaced by a new subassembly.

Advantageously, the unitary subassembly further comprises at least one elongate structural member connecting the fluid inlet member and the fluid outlet member and spanning the length of the tubular member.

Since the tubular membrane of the milk pump is flexible it cannot be easily manipulated when removably inserting the subassembly in the housing. By providing a structural member the fluid inlet and outlet members are spaced apart and the whole unitary subassembly is rigid and is easy to manipulate and easy to insert into the pump housing.

Advantageously the elongate structural member is an elongate plate-like member.

The tubular membrane, when it expands during pumping, will align against the structural member. By providing an elongate plate-like member the membrane can expand against the generally continuous surface of the plate instead of to e.g. a narrow beam. Wear and tear of the tubular member is thus reduced. Additionally the plate-like members act as filling members in the housing reducing the volume of air to be displaced in the pumping action saving energy.

Advantageously a pair of elongate top and bottom plate like members together substantially enclose the tubular member.

By providing a pair of elongate plate-like members the tubular member is effectively housed between the plate-like members. Thus the subassembly is very easy to manipulate and can be easily inserted in or removed out of the housing of the pump. Also, when the subassembly is outside the pump housing the plates protect the tubular member against damage and dirt. Additionally the larger plate-like members act again further reduce the volume of air to be displaced in the pumping action saving more energy.

Further advantageously the flexible tubular member is a silicone member. Although other types of rubber or synthetic rubber may be used, silicone has very good wear and tear properties for milking machines. Silicone does not absorb milk fat or moisture as other materials may do. Silicone is flexible even at low temperatures and is resistant deterioration due to chemicals that may be used in cleaning the milking system.

Further advantageously, the flexible tubular member has a cross-sectional thickness chosen from the range of 0.5-5 mm, preferably chosen from the range of 1.5-4 mm.

Due to the heavy duty use of the tubular member it will wear relatively quickly. Especially at the edges because the tubular member is kept in its collapsed state during the whole milking of a single animal, which in case of cows may take as long as 6-8 minutes. By carefully choosing the thickness the stress on the folding edges of the tubular sleeve in collapsed state, is reduced.

Further advantageously, the fluid inlet member and the fluid outlet member of the pump each comprise an inlet base and an inlet ring and an outlet base and an outlet ring respectively and wherein the first and a second open ends of the tubular member are confined between the inlet base and inlet ring and between the outlet base and outlet ring respectively. And the inlet base and the outlet base each include an inlet frustoconical body and an outlet frustoconical body respectively and the tubular member during use in the compression stage follows the contours of the frustoconical bodies.

By providing a base and ring connection to hold the free end of the tubular member pressure on the tubular member is evenly distributed on the circumference of the open ends of the tubular member. Such even pressure ensures an even surface of the tubular member during expansion and collapse. The frustoconical shape of the inlet and outlet members ensures in compressed or collapsed state a very minute and negligible residual volume remains because the tubular member follows the contours of the conical shape and is pressed completely against it. The stretch of tubular member between the inlet and outlet members allows the tubular member to completely flatten without wrinkles or folds. This means that all or very nearly all milk or cleaning fluid present in the tubular member is removed upon compression of the tube. Yield and cleanability of the milking installation and in particular of the pump is thus increased.

Advantageously the slope of the frustoconical bodies is preferably between 30-50 degrees, preferably between 35-45 degrees.

By providing this slope so-called dead areas in which fluid does not circulate or only eddies during pumping are avoided. This improves laminar flow which improves the hygienic aspects of the milk pump, which improves milk quality and reduces lypolysis of the milk produced by the milking installation.

Advantageously the one-way flow is realized by a non return inlet valve connected to the inlet member and a non return outlet valve connected to the outlet member.

And further advantageously the non-return inlet and outlet valves are fluid pressure actuated ball valves. The ball valves enhance the laminar flow of the milk and/or the cleaning fluids. This enhances the hygienic properties of the milk pump, reduces lypolysis and improves overall milk quality of the milking installation.

Advantageously the housing of the milk pump has a pair of opposite first and second openings and the subassembly is retractably insertable into the housing through at least one of the first and second openings.

By choosing an elongate tube like housing with the opening at one end through which the unitary subassembly can be removably inserted quick servicing of the milking installation is improved. Also this way the air tightness of the housing is improved since only relatively small openings of the housing require sealing. This is advantageous in particular since in the milking installation the pump uses relatively high operating pressure which may amount to as much as 4 bar. In such systems it is advantageous to have only small areas that need to be sealed one from the other.

Further advantageously only the first opening of the housing is large enough to accommodate insertion of the subassembly to through it and the housing further includes an end cap substantially closing the first opening upon insertion of the subassembly into the housing. This way air leakage risk is further reduced and the area that needs to be sealed is further reduced.

Particularly advantageously the housing has a hollow tubular body, a first end wall and a second end wall between which the body extends, the first and the second end walls including a pair of opposite first and second housing openings through which during use a hollow tubular inlet portion and a hollow tubular outlet portion of the respective inlet and outlet members of the subassembly project which portions hermetically seal the subassembly with respect to the housing and the first and/or the second end walls is/are formed as a end caps lockable to open end(s) of the tubular housing body through which the unitary subassembly is removably insertable.

This configuration of housing and subassembly allows for easy insertion of the subassembly into the housing while at the same time ensuring a hermetic seal between housing and subassembly.

Further advantageously, quick couplings are provided to lock the end cap to the housing. No tools are needed to change one subassembly for another one. The milk lines are removed from the pump, the end cap is opened, the subassembly is pulled out and changed for another one that is inserted. Subsequently the cap is closed. The milk lines are re-attached and the milking installation is ready for use.

Further particularly advantageous the flexible tubular member during use in the compression stage the collapsed tubular member acts as a valve between the de-aeration unit and a milk storage unit of the milking installation. By having the tubular membrane acting as a valve the whole milking installation needs fewer parts which of course is cost-effective.

Advantageously, the unitary sub-assembly is removable assembled to the milking installation by means of quick couplings. No tools are needed to change the sub-assembly.

Hose clamps of the quick coupling type are provided at the milk inlet and milk outlet. Thus when the subassembly needs to be removed the milk lines can easily be uncoupled without using tools. The milk lines are removed from the pump, the end cap is opened, the subassembly is pulled out and changed for another one that is inserted. Subsequently the cap is closed. The milk lines are re-attached and the milking installation is ready for use.

BRIEF DESCRIPTION OF THE DRAWINGS

The features and advantages of the invention will be appreciated upon reference to the following drawings, in which:

FIG. 1 is a milking installation according to an embodiment of the invention.

DESCRIPTION OF ILLUSTRATIVE EMBODIMENTS

Figure 1:
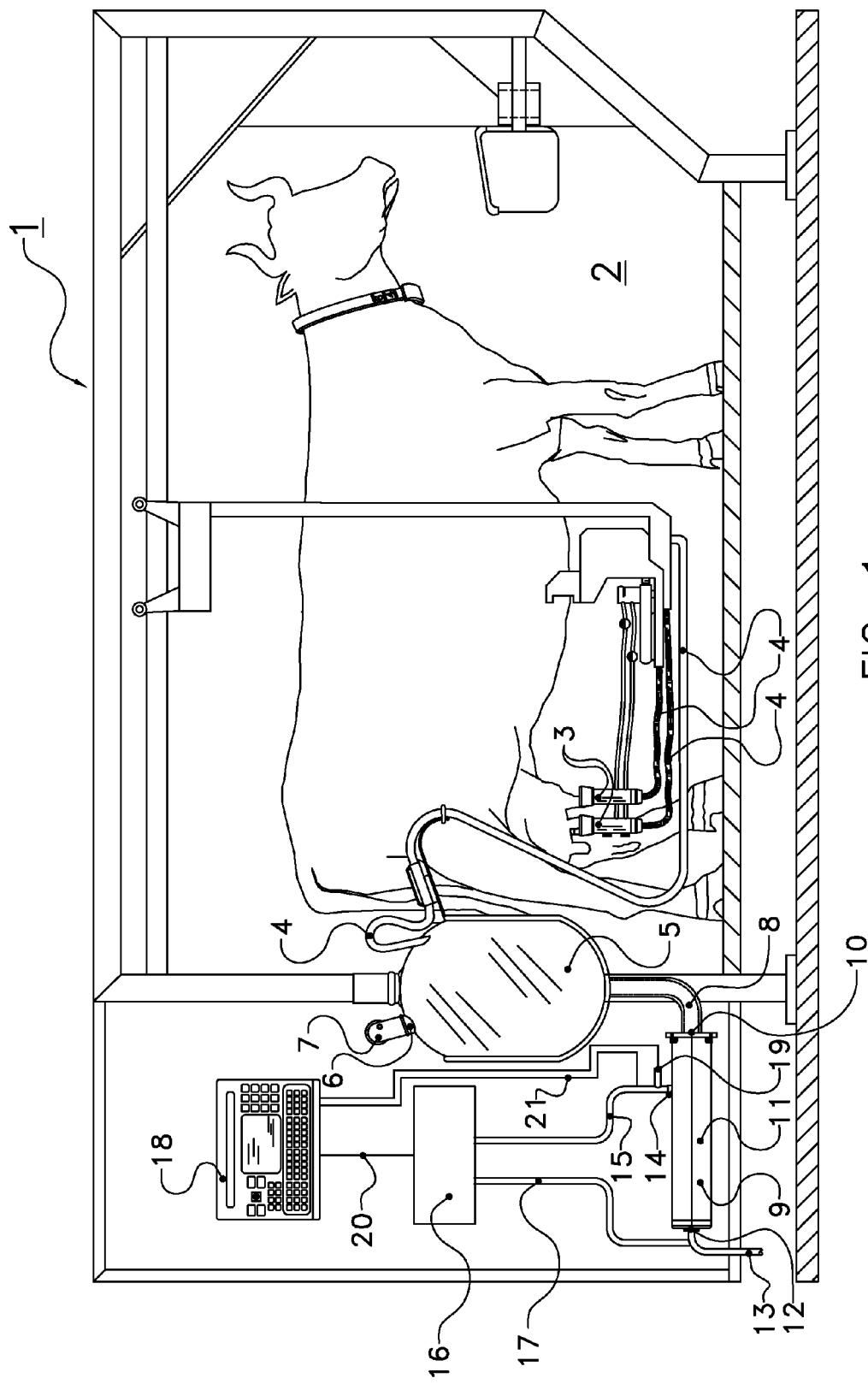
FIG. 1 is

The following is a description of certain embodiments of the invention, given by way of example only and with reference to the drawings. FIG. 1 shows a milking installation 1 provided with a milking robot 2 for automatically connecting teat cups 3 to the teats of a dairy animal. Milk lines 4 extend between the teat cups and a milk de-aeration unit or milk glass 5. A de-aeration port 6 is present at the top of the de-aeration unit and a de-aeration line 7 connects the milk glass to a vacuum system (not shown). At the bottom of the milk glass a milk inlet line 8 is provided which connects the milk glass to the milk pump 9. The milk pump includes a milk inlet 10, a pump housing 11, a milk outlet 12. A further milk outlet line 13 is connected to the milk outlet 12 which leads to a milk storage unit or milk separation units (not shown). Generally the outlet can be branched and a manifold can be interposed such that milk can be separated out to several milk containers. Thus e.g. colostrums can be separated and be used to feed calves. Milk pump 9 further includes a connection port 14 at the housing to which an air line 15 is connected which is coupled to a source of alternating pressure 16. A second air line 17 connects to the outlet milk line 13 and can be used to blow the milk outlet line empty of milk and/or cleaning fluid. A control unit 18 controls the operation of the milking installation and of the pump. A leak sensor 19 is provided at a side branch 85 of the connection port 14 of pump 9. Control lines 20, 21 and 22 connected to control unit 18 indicate that control unit 18 controls the alternating pressure source 16, the usage of the air line 17 to blow the milk outlet line 13 empty, controls the operation of the pump 9 and safety control of the pump based on leak sensor 19. Hose clamps (not shown) are provided connecting the milk inlet and milk outlet of the pump to the milk lines. The clamps preferably are of the quick coupling type thus facilitating quick servicing of the milking installation.

Figure 2:
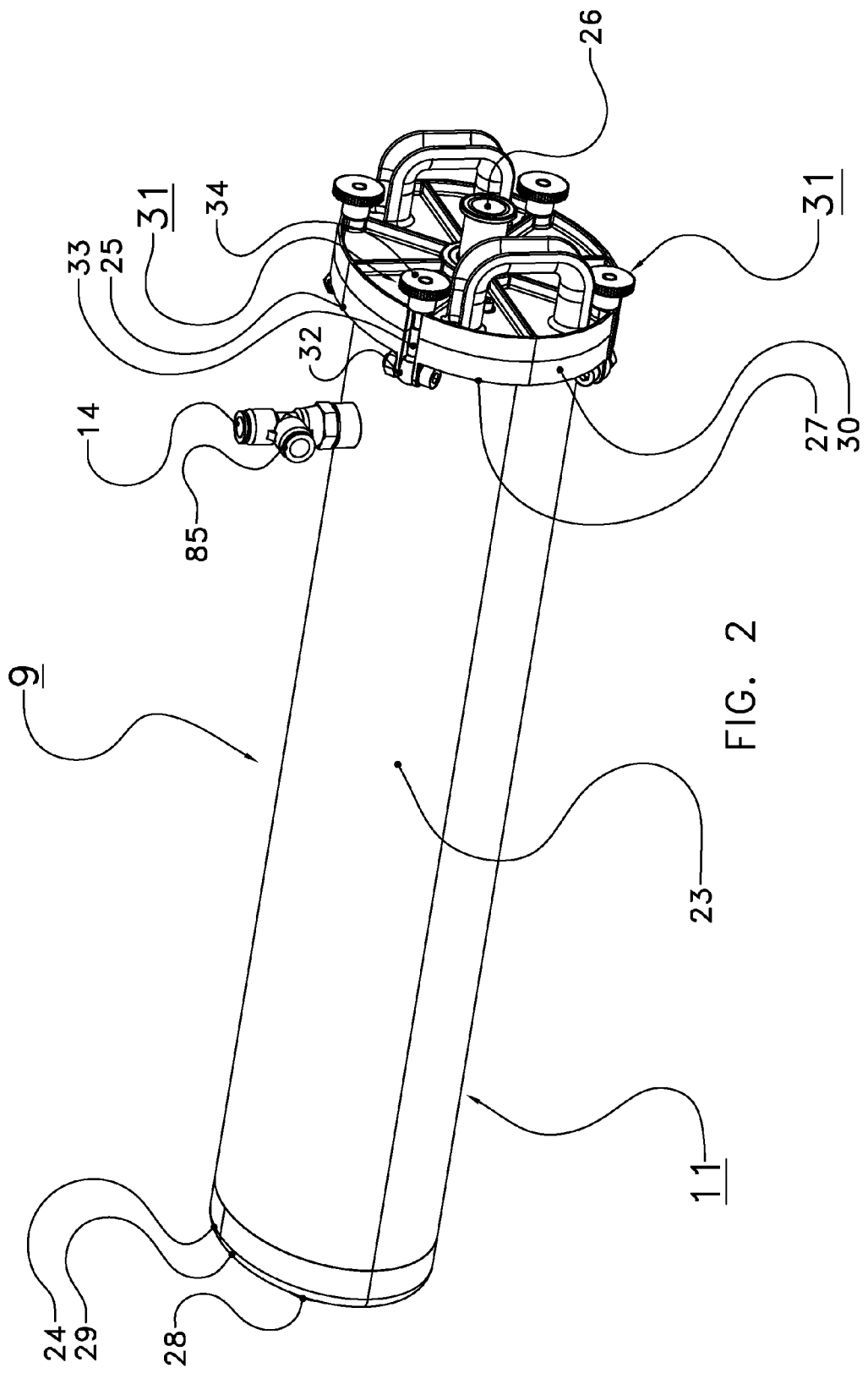
FIG. 2 is a schematic perspective view of the milk pump of the milking installation of invention.
Figure 3:
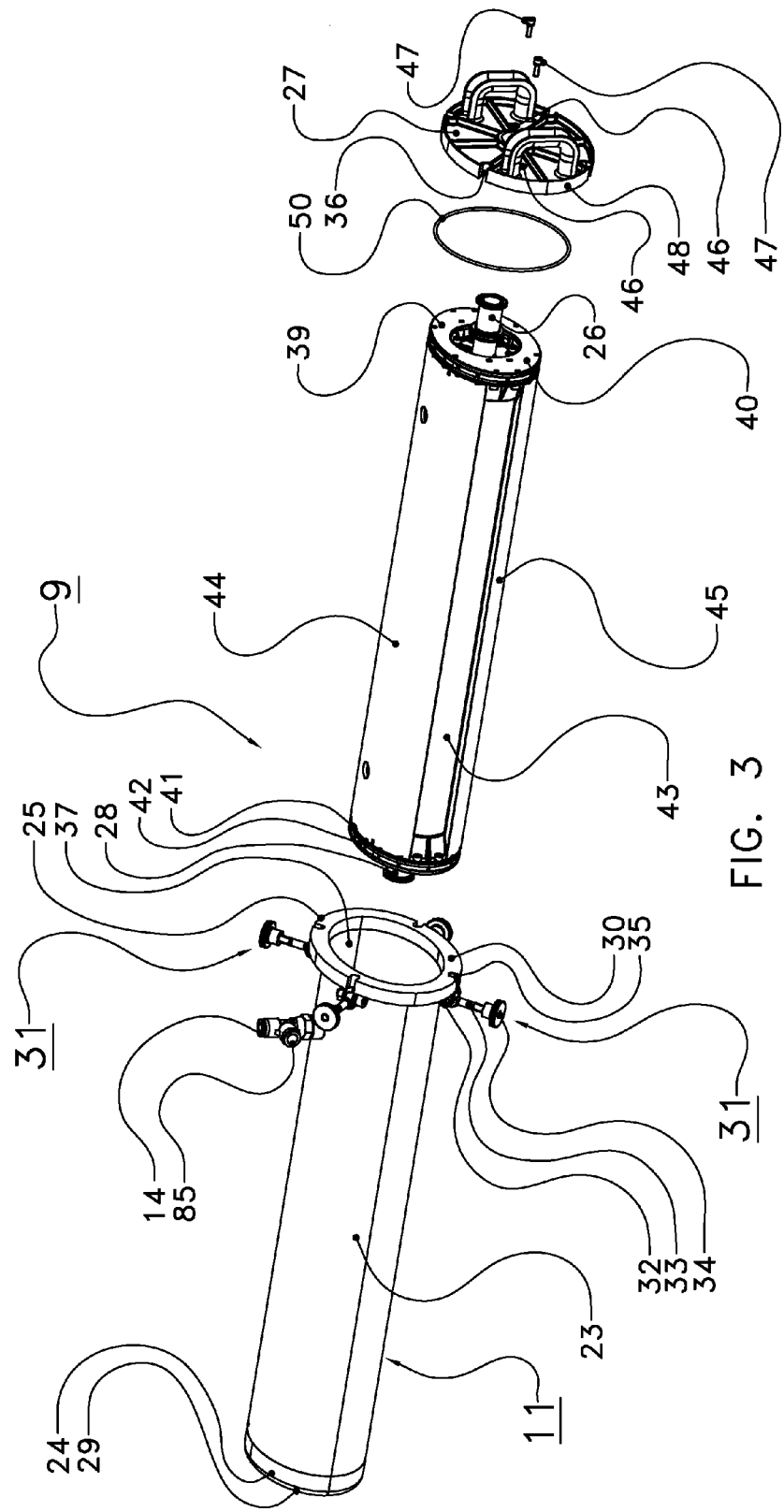
FIG. 3 is a schematic perspective exploded view of the milk pump of the milking installation showing a milk pump housing, a unitary subassembly and an end cap.

The milk pump 9 is a membrane pump which type of pump is known to be gentle to the milk and thus reduce occurrence of lypolysis of the milk when pumped through the milking installation. As best seen in FIGS. 2 and 3 the pump 9 has housing 11 which includes elongate tubular body 23, a left end 24 and a right end wall 25, a tubular inlet 26 at the right end 25 projecting through right end wall 27 and a tubular outlet 28 at the left end 24 projecting through left end wall 29.

An air connection port 14 is present in the housing body 23 adjacent right end 25 of the tubular housing 11. At the right end of the housing body 23 a radially extending annular flange 30 is provided. A number of quick-coupling clamps 31 are provided connecting the right end wall 27 which is in the form of a separate cover to the right end of the body 23 and thus close the housing. The quick-coupling clamps 31 include a base 32 connected to annular flange 30, a stem 33 and a head 34. As is best visible in FIG. 2 the base 32 includes a hinge and stem 33 is thus hingeably connected to annular flange 30. Both annular flange 30 and cover 27 include axial grooves 35, 36 in the outer circumference of the flange and the cover. The flange grooves 35 and cover grooves 36 when aligned accommodate the stem 33 of each clamp 31. The clamp head blocks inadvertent release of the clamp and can include an inner thread that cooperates with an outer thread on the stem in order for the head to be screw into abutting position to the cover.

Pump housing 11 thus defines an internal room 37 in which a unitary subassembly 38 is accommodated. The subassembly 38 includes at the right end 39 a fluid inlet member 40 with the tubular inlet 26 and at the left end 41 a fluid outlet member 42 with the tubular outlet 28. A flexible tubular member 43 such as a silicone sleeve is attached to and extends between the fluid inlet and fluid outlet members 40, 42. Also extending between the fluid inlet and fluid outlet members 40, 42 are top and bottom plates 44, 45. The plates are structural members spanning the soft and floppy sleeve. They thus make the whole unitary subassembly rigid and easy to manipulate and easy to insert into the pump housing. Also as can be seen in FIG. 3 the top and bottom plates 44, 45 enclose most of the sleeve 43 and only leave a pair of elongate gaps open at either side of the subassembly. Thus the plates protect the sleeve and do not hinder sideway expansion of the sleeve.

As is best visible in FIG. 3, the cross-sectional shape of the pump housing is oval. The subassembly 38 has an outer shape that closely matches the shape of the internal room 37 of the housing. Top and bottom plates 44, 45 thus are slightly curved to follow the oval curvature of the pump housing. Also the inner surfaces of the plates 44, 45 that are facing the sleeve 43 are smooth, allowing wrinkle free alignment of the sleeve in expanded state with these surfaces.

Cover 27 further includes a pair of through holes 46 through which a pair of screws 47 can project by which the cover can be fixed to the subassembly 38 at the fluid inlet member 40 thus maintaining the position of the right end 39 of the subassembly during pumpage. Axial inner surface 48 of the cover 27 facing the annular flange 30 is provided with an annular groove 49 in which a seal 50 is accommodated. When cover 27 closes pump housing 11 the seal ensures that the housing is hermetically closed.

Figure 4:
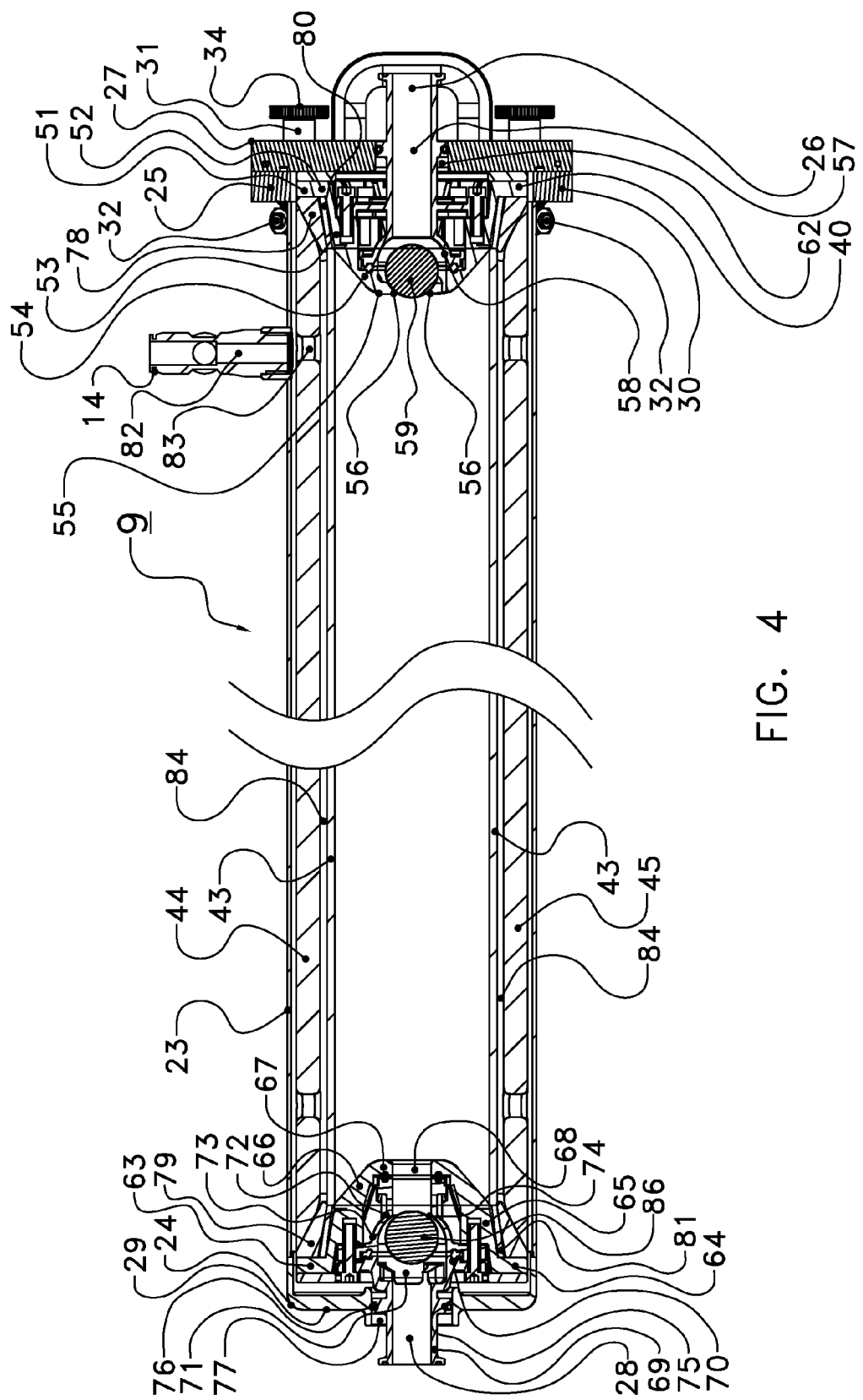
FIG. 4 is a cross sectional view of the pump of the milking installation.

The fluid inlet member 40, as best seen in FIG. 4, includes a frustoconical cup shaped body 51 with an open flanged base 52, a first portion 53, a second portion 54, a head portion 55 having a multi-lobed opening 56. The fluid inlet member 40 further includes the tubular inlet 26 having a tube portion 57 ending at one end in a hollow left cup shaped head portion 58 with a central circular opening. The head portions 55, 58 of the frustoconical body 51 and of tubular inlet 26 are the complementary housing parts of a non-return inlet ball valve and accommodate ball 59. This type of non-return valves is known in the art and is not further described.

Hollow tubular stem 57 of the inlet 26 is provided with an annular o-ring seat 60 for O-ring 61 which provides a hermetic seal between a central opening 62 in cover 27 and inlet 26 which projects through opening 62 when the subassembly is inside the pump housing and the cover is closed.

The fluid outlet member 42 is similarly shaped and includes a frustoconical cup shaped body 63 with an open flanged base 64, a first portion 65, a second portion 66, a head portion 67 having a circular opening 68. The fluid outlet member 42 further includes the tubular outlet 28 in the form of a hollow outer tube 69 ending at one end in a hollow right cup shaped head portion 70 with a multi lobed central opening 71 and an inner tube 72 ending at one end in a hollow left cup shaped head portion 73 with a central circular opening 74. The head portions 70, 72 of the tubular outlet 28 are the complementary housing parts of a non-return outlet ball valve and accommodate ball 86. This type of non-return valves is known in the art and is not further described.

Hollow outer tube 69 of the outlet 28 is provided with an annular o-ring seat 75 for O-ring 76 which provides a hermetic seal between a central opening 77 in left end wall 29 and outlet 28 which projects through opening 77 when the subassembly is inside the pump housing.

The fluid inlet and outlet members 40, 42 further each include respectively an annular inlet connector 78 and an annular outlet connector 79. The first open or right sleeve end 80 is held between the first portion 53 of the inlet base 51 and annular inlet connector 78 and the second open or left sleeve end 81 is held between the first portion 65 of the outlet base 63 and annular outlet connector 79. The annular connectors 78, 79 ensure that the sleeve ends are held with evenly distributed pressure for a wrinkle free connection of the sleeve and the in- and outlet of the subassembly.

The first portions 53, 65 of both frustoconical bodies 51, 63 have a minor incline towards a central mirror axis of the respective in- and outlet members 40, 42 which incline allows easy assembly of the sleeve and connection of the two annular connectors 78, 79 to these respective first portions 53, 65. The second portions 54, 66 of the frustoconical bodies 51, 63 of the in- and outlet members 40, 42 have a carefully chosen inclined surface of which the slope angle relative to a central mirror axis of the in- and outlet members 40, 42 is between 30-50 degrees, preferably between 35-45 degrees. Thus in use the sleeve 43 in the compression stage of pumping aligns with these inclined surfaces and folds around the head portions 55, 67 when it collapses in on itself and pushes the milk or cleaning fluid out of the sleeve through the milk outlet. In completely collapsed position the sleeve walls are atop each other closely following the axial center line of the pump. Another advantage of the chosen slope angle of the second portions 54,66 is that so called dead-areas between each of the frustoconical bodie 51, 63 and adjacent sections of the top and bottom plates 44, 45 are avoided. Dead-areas are areas in which in de-compressed state milk or cleaning fluid will not circulate or flow but be stagnant or eddy. Stagnancy or eddying of fluids are undesirous in a pump, especially for degradable food stuffs. By avoiding these dead spots the laminar flow improves, which improves the hygienic aspects of the milk pump, which improves milk quality and reduces lypolysis of the milk produced by the milking installation.

Connection port 14 has an inner channel 82 of which the opening is aligned with a through opening 83 in top plate 44. The channel 82 thus is in open communication with a space 84 between the outer surface of the sleeve 43 and the inner walls of the pump housing 11 and of the top and bottom plates 44, 45. A side branch 85 (best visible in FIGS. 1 and 2) is provided at the connection port 14 to which a leak sensor (not shown) is connected.

The sleeve 43 is preferably silicone and has a cross-sectional thickness of between 0.5-5 mm. Preferably the sleeve has a thickness of between 1.5-4 mm. Due to the heavy duty use of the tubular member it will wear relatively quickly. Especially at the edges because the tubular member is kept in its collapsed state during the whole milking of a single animal, which in case of cows may take as long as 6-8 minutes. By carefully choosing the thickness the stress on the folding edges of the tubular sleeve in collapsed state, is reduced.

In use the milking installation while extracting milk from an animal such as a cow will lead the milk to the milking glass 5. During this stage the control unit 18 will ensure that the pump is in a so-called compressed stage. In the compressed stage air (or another medium) is pumped through channel 82 of connection port 14 into space 84 between sleeve 43 and plates 44, 45. The pressure, which can be up to 4 bar atmospheric overpressure, causes sleeve 43 to collapse which by this action pushes any liquid (milk or cleaning fluids) out of the sleeve. In collapsed state the closed sleeve 43 acts as valve to the milk in milk glass 5. At the same time ball 59 of the non-return inlet valve will be pushed against a circular central opening between the tubular stem 57 and cup shaped head 58 of the tubular inlet 26, thus also effectively closing the inlet.

When the milking action is ended, the milk glass 5 is to be emptied before the next animal may be milked. The control unit 18 now causes the pressure in space 84 to be removed and a vacuum is provided. This cause sleeve 43 to expand and ball 59 is moved into engagement with the multi lobed opening 56 allowing milk to flow into the interior of the sleeve. At the same time ball 86 of the outlet non return valve is moved to engage the circular central opening 74 of the inner tube 72, and prevents the milk from leaving the sleeve 43. When the sleeve is full and in the decompressed state, the control unit alternates the air flow back to let pressured air enter the space 84 between sleeve and housing. Thus the sleeve is compressed and the milk is pushed out of the sleeve through the non-return valve in the fluid outlet member 42. The ball 86 of the fluid outlet member is pushed against the multi lobed opening 71 of the right cup shaped head portion 70 of the fluid outlet member 42, thus milk is allowed to pass the ball and flow out of the sleeve. At the same time ball 59 will be pushed against a circular central opening between the tubular stem 57 and cup shaped head 58 of the tubular inlet 26, thus also effectively closing the inlet. By reiterating these steps and alternate between decompressing and compressing the sleeve of the pump, milk will be pumped out of the milking glass 5 to a storage or separation container.

For cleaning the installation cleaning fluid will be pumped through the pump. The process of pumping is the same as for pumping the milk.

Milking installations are intensively used and thus the pump will also be intensively used. Servicing the pump will be necessary but the down-time of the milking installation is to be kept to a minimum. The subassembly 38 is easily removably placed in the pump housing 11. By shaping the first or right end wall 27 as a cover for the right body end 25 and the second or left end wall 24 as a fixed or integral wall to the left or second body end 24, the housing 11 allows the subassembly 38 to be inserted through the first end opening 25. Since both the right wall or cover 27 and the left wall 29 each have a central opening 62, 77 through which tubular portions 57, 69 of the respective inlet and outlet members 40, 42 can extend, the subassembly can be completely encompassed by the pump housing. Quick couplings 31 to the cover 27 allow for easy, quick and tool-less opening of the pump housing. Easy and quick servicing of the pump is thus a fact. Hose clamps or quick couplings holding the milk lines to the pump detached, and the milk lines are uncoupled from the respective tubular portions 57, 69 of the respective inlet and outlet members 40, 42 leaving tubular portions 57, 69 bare. Then the cover 27 is opened by loosening the quick couplings 31. Once the cover 27 is removed the right end of the pump is open and the subassembly is pulled out. A new subassembly is inserted. When the O-ring 76 on outer tube 69 seals opening 77 of the fixed wall 29 the subassembly is properly inserted. The cover 27 can now be re-mounted to the housing aligning O-ring 61 with central opening 62 in cover 27. After the cover is closed the milk lines are re-attached and the milking installation is ready for use.

Although in the description reference is made to a milking installation with a milking robot automatically connecting teat cups to the teats, it will be evident that the invention applies equally to milking installations without robotic connection of the teat cups.

Wireless control of several functions of the milking installation using e.g. transducers is of course possible even though in the example control lines 20, 21, 22 are indicated as hard wired control lines.

Although only a single milk outlet line is shown, generally the outlet can be branched and a manifold can be interposed such that milk can be separated out to several milk containers. Thus e.g. colostrums can be separated and be used to feed calves.

In this regard also, non-return ball valves have been described other types of non-return valves are also possible although not preferred.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A milking installation comprising a milk de-aeration unit and a membrane milk pump, the milk pump pumps milk out of the milk de-aeration unit, the milk pump comprising:
a tubular housing,
a flexible tubular member insertable in said housing and being hermetically sealeable with respect to the housing, and comprising a first and a second open end,
a fluid inlet member and a fluid outlet member attachable respectively to the first and second open ends of the tubular member,
wherein the inlet member and the outlet member define a one-way flow path through the tubular member, and
wherein the housing comprises a connection port for coupling to a source of alternating pressure which during use alternatingly varies the pressure in a space between the housing and the tubular member between a decompression stage in which the tubular member expands and a compression stage in which the tubular member collapses pushing milk out of the tubular member and wherein the flexible tubular member, the fluid inlet member and the fluid outlet member form a unitary subassembly that is removably insertable in said housing.

2. The milking installation of claim 1, wherein the subassembly further comprises at least one elongate structural member connecting the fluid inlet member and the fluid outlet member and spanning the length of the tubular member.

3. The milking installation of claim 2, wherein the at least one elongate structural member is an elongate plate-like member.

4. The milking installation of claim 3, wherein the at least one elongate structural member is a pair of elongate top and bottom plate-like members, wherein the pair of elongate top and bottom plate-like members together substantially enclose the tubular member.

5. The milking installation of claim 1, wherein the flexible tubular member is a silicone member.

6. The milking installation of claim 1, wherein the flexible tubular member has a cross-sectional thickness chosen from the range of 0.5-5 mm.

7. The milking installation of claim 1, wherein the fluid inlet member and the fluid outlet member each comprise an inlet base and an inlet ring and an outlet base and an outlet ring respectively and wherein the first and a second open ends of the tubular member are confined between the inlet base and inlet ring and between the outlet base and outlet ring respectively.

8. The milking installation of claim 7, wherein the inlet base and the outlet base each include an inlet frustoconical body and an outlet frustoconical body respectively and wherein the tubular member during use in the compression stage follows the contours of the frustoconical bodies.

9. The milking installation of claim 8, wherein the slope of the frustoconical bodies is preferably between 30-50 degrees.

10. The milking installation of claim 1, wherein the one-way flow is realized by a non return inlet valve connected to the inlet member and a non return outlet valve connected to the outlet member.

11. The milking installation of claim 10, wherein the non return inlet and non return outlet valves are fluid pressure actuated ball valves.

12. The milking installation of claim 1, wherein the housing comprises a hollow tubular body having a first end wall and a second end wall between which the body extends, the first and the second end walls including a pair of opposite first and second housing openings through which during use a hollow tubular inlet and a hollow tubular outlet portion of the respective inlet and outlet members of the subassembly project which portions hermetically seal the subassembly with respect to the housing.

13. The milking installation of claim 12, wherein at least one of the first and the second end walls is formed as an end cap lockable to an open end of the tubular housing body through which open end the unitary subassembly is removably insertable.

14. The milking installation of claim 13, wherein quick couplings are provided to lock the end cap to the housing.

15. The milking installation of claim 1, wherein the milking installation further includes a milk storage unit and wherein the flexible tubular member during use in the compression stage the collapsed tubular member acts as a valve between the de-aeration unit and the milk storage unit.

16. The milking assembly of claim 1, wherein the subassembly is removable assembled to the milking installation by means of quick couplings.

* * * * *